(12) United States Patent
Matsuoka et al.

(10) Patent No.: US 7,960,051 B2
(45) Date of Patent: Jun. 14, 2011

(54) HOLDING MEMBER AND BATTERY PACK

(75) Inventors: Toshiyuki Matsuoka, Utsunomiya (JP); Atsushi Mizutani, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 1234 days.

(21) Appl. No.: 11/450,279

(22) Filed: Jun. 12, 2006

(65) Prior Publication Data

US 2006/0286440 A1    Dec. 21, 2006

(30) Foreign Application Priority Data

Jun. 16, 2005    (JP) ................................ 2005-176226

(51) Int. Cl.
*H01M 2/10*    (2006.01)
(52) U.S. Cl. ........................... 429/99; 429/156; 429/159
(58) Field of Classification Search ............ 429/96–100, 429/156–160
See application file for complete search history.

(56) References Cited

U.S. PATENT DOCUMENTS

| | | | |
|---|---|---|---|
| 6,340,877 B1 * | 1/2002 | Mita et al. ...................... | 320/112 |
| 6,558,835 B1 | 5/2003 | Kurisu et al. | |
| 6,783,886 B1 | 8/2004 | Sakakibara et al. | |
| 2003/0193313 A1 * | 10/2003 | Takedomi et al. ............ | 320/107 |
| 2004/0043287 A1 * | 3/2004 | Bando et al. .................. | 429/156 |
| 2005/0064280 A1 * | 3/2005 | Watanabe et al. ............. | 429/120 |

FOREIGN PATENT DOCUMENTS

| | | |
|---|---|---|
| JP | 2001-148235 A | 5/2001 |
| JP | 2003-217555 A | 7/2003 |
| JP | 2003-308816 (A) | 10/2003 |
| JP | 2005-123069 A | 5/2005 |

OTHER PUBLICATIONS

Chinese Office Action dated Feb. 6, 2009, issued in corresponding Chinese Patent Application No. 200610092505.0.
Japanese Office Action dated Dec. 7, 2010, issued in corresponding Japanese Patent Application No. 2005-176226.

* cited by examiner

*Primary Examiner* — Basia Ridley
*Assistant Examiner* — Jacob Buchanan
(74) *Attorney, Agent, or Firm* — Westerman, Hattori, Daniels & Adrian, LLP

(57) ABSTRACT

A holding member attached to outer peripheries of a plurality of adjacent cylindrical cell modules which are arranged parallel along axes thereof. Each cell module is formed by a plurality of unit cells serially connected, and the holding member is positioned in the middle of the cell modules along the axes thereof so that a gap is secured between the cell modules. The holding member has a plurality of circular holding portions for respectively holding the cell modules, wherein the holding portions are coupled with each other, and the coupled holding portions have a plurality of divided portions at which the coupled holding portions are divided into two holding bodies, each being fit over the cell modules; and a coupling device for coupling the divided portions positioned between adjacent two of the holding portions.

10 Claims, 11 Drawing Sheets

"HOLDING MEMBER AND BATTERY PACK

BACKGROUND OF THE INVENTION

1. Field of the Invention

The present invention relates to a battery pack formed by arranging a plurality of cell modules, and to a holding member attached to an outer periphery of each cell module.

Priority is claimed on Japanese Patent Application No. 2005-176226, filed Jun. 16, 2005, the content of which is incorporated herein by reference.

2. Description of the Related Art

A battery pack may be formed by stacking cylindrical cell modules in a frame in a zigzag form, where each cell module is formed by serially connecting a plurality of unit cells (see Reference Document 1: Japanese Unexamined Patent Application, First Publication No. 2003-308816). In the battery pack disclosed in Reference Document 1, holding members, each having a polygonal section, are attached to the outer periphery of each cell module at specific intervals along the axis of the cell module, and a plurality of the cell modules are stacked in a zigzag in a manner such that corresponding outer faces of the holding members of adjacent cell modules contact each other.

The above conventional holding member has a circular shape, and is attached to the cell module by making the cell module pass through the holding member. Therefore, in order to combine the cell module with the holding member without play, the holding member should be made of an elastic material and be attached to the cell module by using elastic deformation, which makes the attachment operation inconvenient. In addition, in this case, there is little flexibility in selection of the material for making the holding member.

SUMMARY OF THE INVENTION

In light of the above circumstances, an object of the present invention is to provide a holding member which is easily attached to a cell module, and has high flexibility in selection of a material for making the holding member, and by use of which reduction in size of the battery pack is possible.

Therefore, the present invention provides a holding member (e.g., a grommet 50 in an embodiment explained later) attached to outer peripheries of a plurality of adjacent cylindrical cell modules (e.g., cell modules 10 in the embodiment) which are arranged parallel along axes thereof, wherein each cell module is formed by a plurality of unit cells (e.g., unit cells 11 in the embodiment) serially connected, and the holding member is positioned in the middle of the cell modules along the axes thereof so that a gap is secured between the cell modules, the holding member comprising:

a plurality of circular holding portions (e.g., holding portions 53 and 54 in the embodiment) for respectively holding the cell modules, wherein the holding portions are coupled with each other, and the coupled holding portions have a plurality of divided portions (e.g., divided portions 70 in the embodiment) at which the coupled holding portions are divided into two holding bodies (e.g., holding bodies 51 and 52 in the embodiment), each being fit over the cell modules; and a coupling device (e.g., a link face 62 and arms 73 in the embodiment) for coupling the divided portions positioned between adjacent two of the holding portions.

In accordance with the above structure, the plurality of the cell modules can be aligned and held by one holding member, thereby improving productivity. In addition, the holding member has two divided holding bodies, each is attached over the plurality of the cell modules; thus, the holding member can be easily attached to the cell modules, thereby also improving productivity. Furthermore, the holding member does not need to have elasticity, and thus can be made of a material having no elasticity. Therefore, flexibility in selection of the material for the holding member can be improved. In addition, the divided holding bodies are coupled using the coupling device for coupling the divided portions positioned between adjacent two of the holding portions; thus, a dimension of the cell modules (to which the holding member is attached) with respect to the axis along which the cell modules are aligned side by side, can be reduced, thereby reducing the size of a relevant battery pack.

In a preferable example, each cell module has an insulation ring (e.g., an insulation ring 30A in the embodiment) positioned between an adjacent two of the unit cells, the insulation ring has a pipe portion (e.g., a pipe portion 32 in the embodiment) surrounding a circumference of the unit cells, and protrusions (e.g., protrusions 34 in the embodiment) are formed on an outer-peripheral face of the pipe portion; and In an inner face of each holding portion, a fittable portion (e.g., a groove 59 in the embodiment) which is fittable to the protrusions of the insulation ring is formed, and positions of the fittable portions of every adjacent two of the holding portions are offset from each other along axes of the cell modules.

In accordance with this structure, the protrusions of the insulation ring can be fit to the fittable portion, thereby highly accurately positioning the holding member with respect to the cell modules along the axes thereof. Therefore, it is possible to reliably and easily stack the holding members of the cell modules and thus to easily assemble the battery pack. In addition, the positions of the fittable portions of every adjacent two of the holding portions are offset from each other along the axes of the cell modules. Therefore, the thickness of the divided portion between the holding portions can be small. Accordingly, the cell modules can be closer to each other in the arrangement thereof, thereby making it possible to reduce the size of the battery pack.

The coupling device may have:

a fittable member (e.g., an arm 73 in the embodiment) extending from an end of one of the holding bodies along an axis thereof, which are divided at the divided portions, wherein the fittable member extends along an outer periphery of the other holding body when the divided holding bodies are coupled; and a fitting reception portion (e.g., a link face 62 in the embodiment) to which the fittable member is fit, wherein the fitting reception portion is provided at an end of the other holding body along an axis of this holding body.

Accordingly, a dimension of the cell modules (to which the holding member is attached) with respect to the axis along which the cell modules are aligned side by side, can be reduced, thereby reducing the size of a relevant battery pack.

In another preferable example, a fittable protrusion is provided on an outer-peripheral face of each holding portion; and a joint portion between any adjacent two of the holding portions has a fitting reception portion to which the fittable protrusion is fit.

In this case, it is possible that:

the fittable protrusion is a pair of fins; and the fitting reception portion is a pair of ribs between which the pair of fins is inserted leaving substantially no gap.

The present invention also provides a battery pack having a plurality of cell modules arranged in a zigzag by aligning and stacking a plurality of the holding members as described above in a manner such that at least one face of an outer-peripheral face (e.g., an outer-peripheral face 60 in the embodiment) of the holding portions of each holding member is made to contact at least one face of an outer-peripheral face (e.g., an outer-peripheral face 60 in the embodiment) of the holding portions of any holding member adjacent to this holding member.

Accordingly, it is possible to easily assemble the battery pack in which the cell modules are arranged in a zigzag, and to reduce the size of the battery pack.

DETAILED DESCRIPTION OF THE INVENTION

Hereinafter, embodiments in accordance with the present invention will be described with reference to the appended FIGS. 1 to 12.

Figure 1:
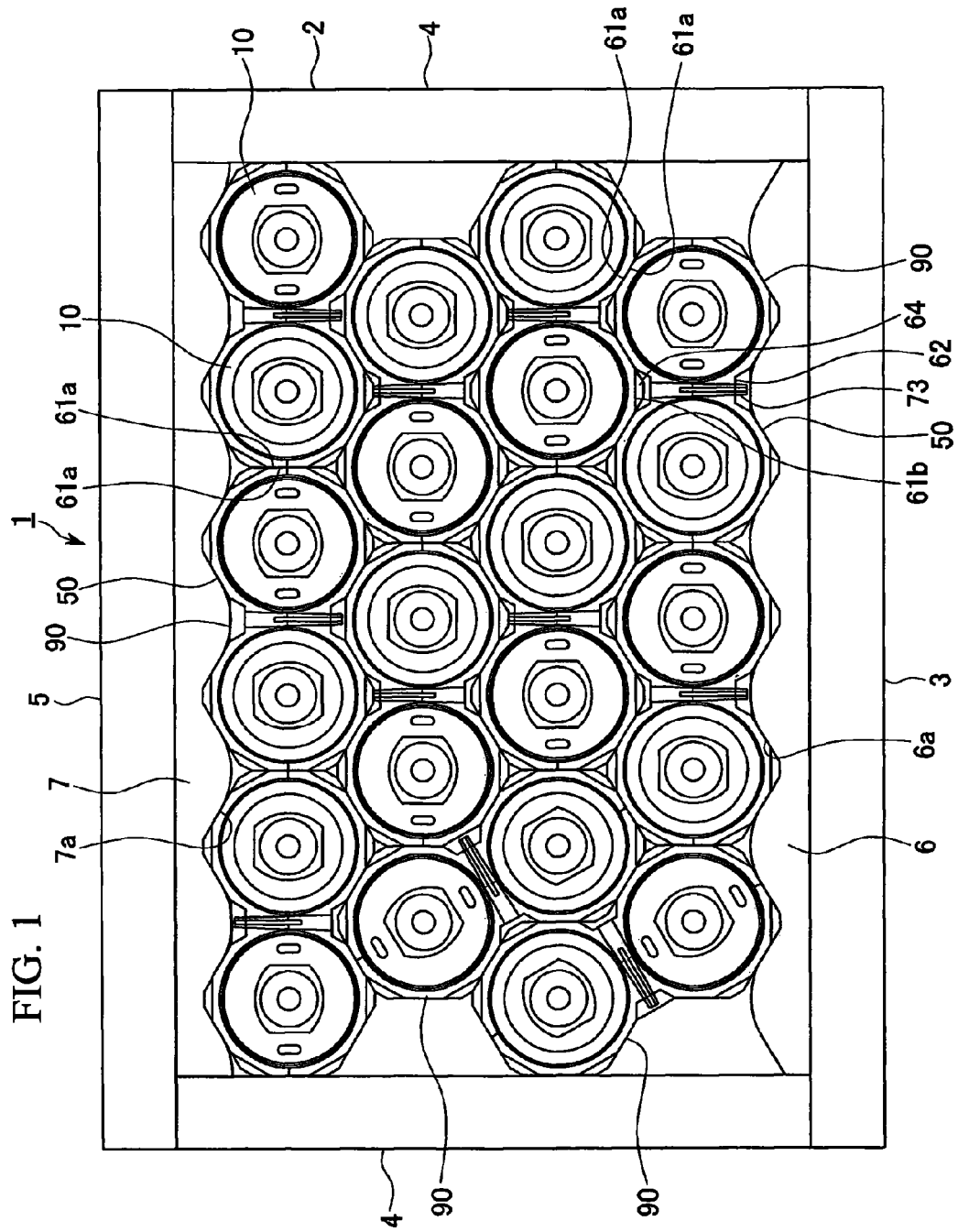
FIG. 1 is a general front view of a battery pack as an embodiment in accordance with the present invention.
Figure 2:
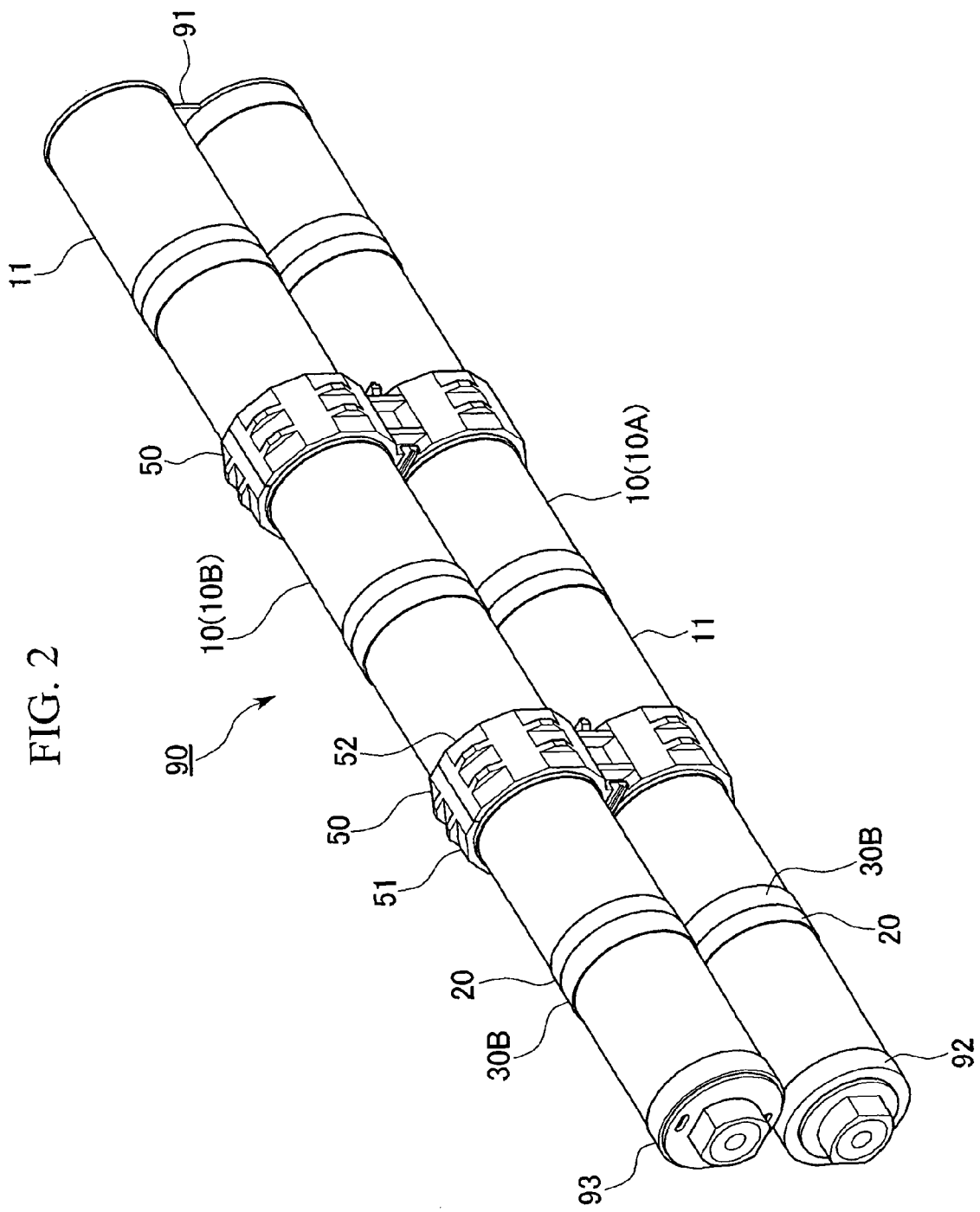
FIG. 2 is a perspective view of the cell module unit in the embodiment.

FIG. 1 is a general front view of a battery pack 1 having a cell box 2 in which a plurality of cell modules 10 (22 modules in the present embodiment) are contained in a manner such that the axes of the cell modules 10 are parallel to each other. As shown in FIG. 2, in this battery pack 1, pairs of cell modules are respectively bound together in advance by using grommets 50 (i.e., holding members), so as to form cell module units 90. A plurality of the cell module units 90 are stacked in a manner such that outer faces of the grommets 50 of adjacent cell module units 90 contact each other, and thereby the cell modules 10 are arranged in a manner such that the axes of the cell modules 10 are parallel to each other. Accordingly, a specific gap is produced between the adjacent cell modules 10, and the cell modules 10 are arranged in a zigzag, observed along the axes thereof. In this battery pack 1, all cell modules 10 (i.e., 22 modules) are serially connected.

The cell box 2 has a bottom plate 3, side plates 4, and a roof plate 5. On the bottom plate 3, an acceptance member 6 is provided for accepting the grommets 50 of the cell modules 10 in the bottom row, and a pushing member 7 for pushing the grommets 50 of the cell modules 10 in the top row is provided at the roof plate 5. Each of an upper surface 6a of the acceptance member 6 and a lower surface 7a of the pushing member 7 has a waved shape in conformity with the outer faces of the relevant grommets 50, which are aligned with the waved shape.

Below, the cell module 10 in the state before they are combined using the grommets 50 will be explained with reference to FIGS. 3 and 4.

Figure 3:
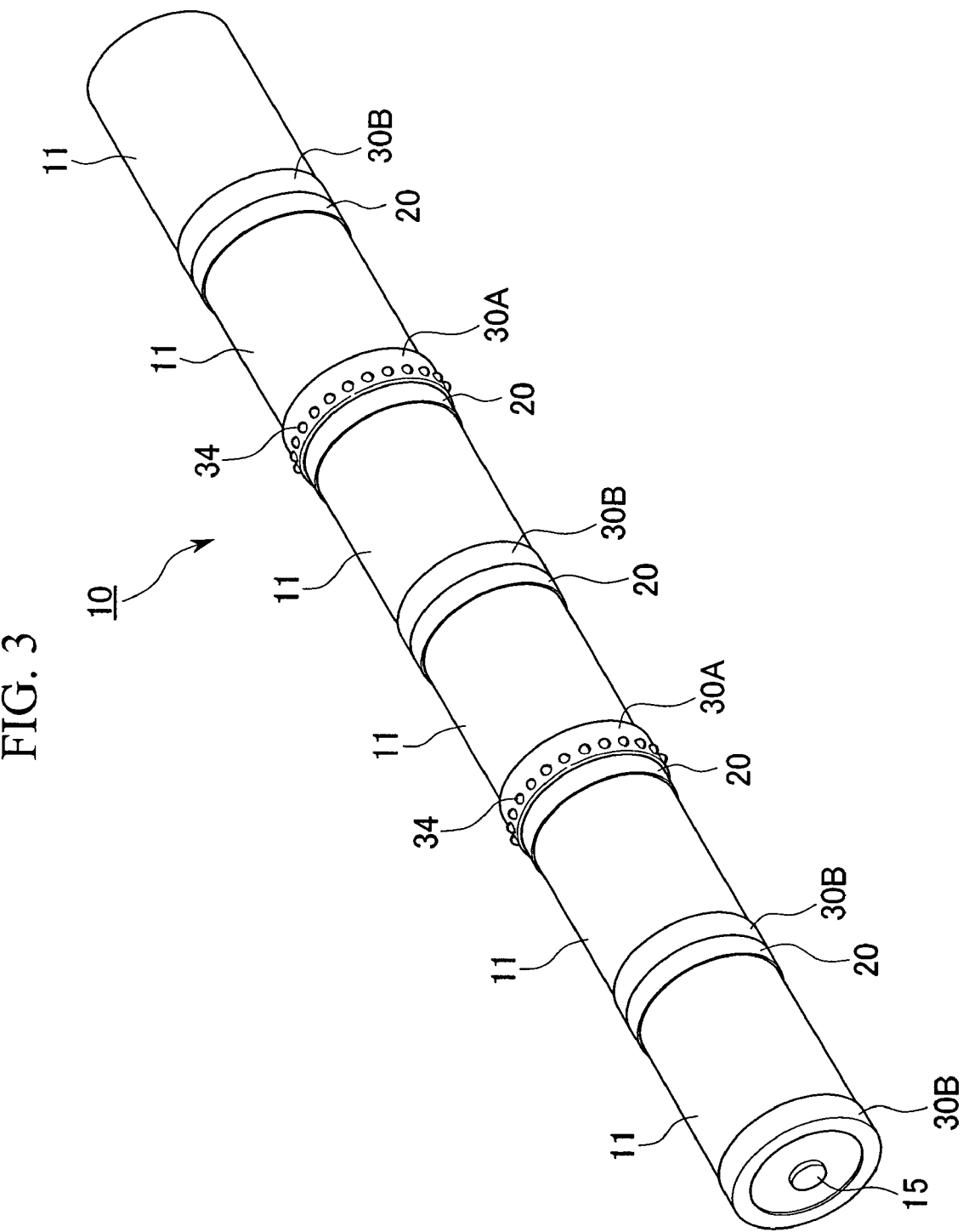
FIG. 3 is a perspective view of the cell module in the embodiment.

As shown in FIG. 3, the cell module 10 includes a plurality of cylindrical unit cells 11 (six unit cells in the example shown) which are serially and linearly connected to each other. Among the unit cells, adjacent unit cells 11 are electrically and mechanically connected to each other via a connection ring 20. An insulation ring 30A or an insulation ring 30B is attached between the connection ring 20 and one of the unit cells 11 connected using this connection ring 20. The insulation ring 30A differs from the insulation ring 30B only in that the insulation ring 30A has protrusions 34 on its outer-peripheral face. Basically, the insulation rings 30A and 30B are arranged alternately. In more detail, one insulation ring 30B having no protrusions 34 is positioned at the center of the cell module 10 along the axis, and two insulation rings 30A, each having protrusions 34, are arranged on either side of the center insulation ring 30B, and two insulation rings 30B, each having no protrusions 34, are arranged at either side of these insulation rings 30A.

Figure 4:
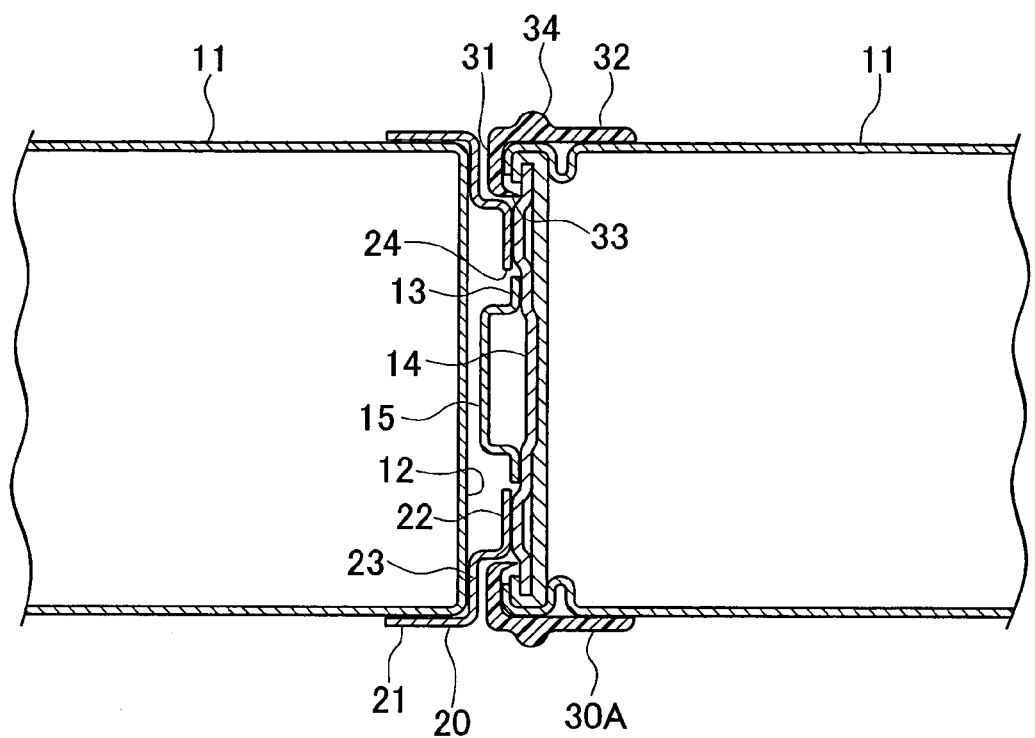
FIG. 4 is a sectional view of a part where two unit cells are connected in the cell module.
Figure 5:
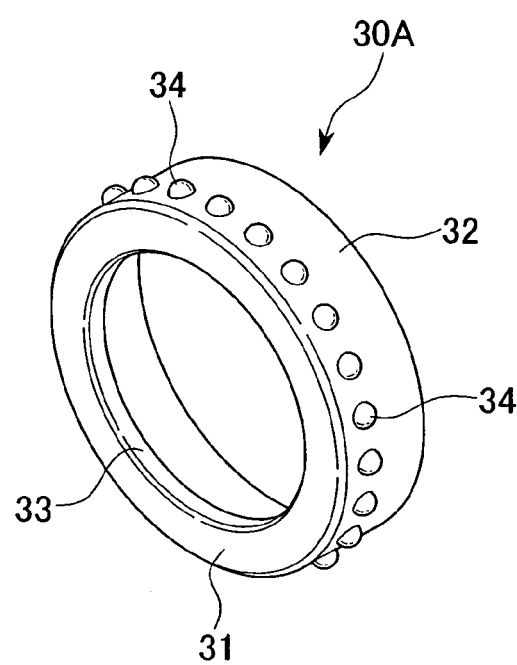
FIG. 5 is a perspective view of an insulation ring in the embodiment.

FIG. 4 is a sectional view of a part where two unit cells 11 are connected and the insulation ring 30A is provided. FIG. 5 is a perspective view of the insulation ring 30A. The connection ring 20 for connecting a negative electrode 12 of one of the unit cells 11 and a positive electrode 13 of the other unit cells 11 has a larger-diameter pipe portion 21 which is fit to an outer-peripheral face of the negative electrode 12, a flange portion 22 which is put in contact with an end plate portion 14 of the positive electrode 13, and a step portion 23 for linking the larger-diameter pipe portion 21 and the flange portion 22. The larger-diameter pipe portion 21 is spot-welded to the outer-peripheral face of the negative electrode 12, and the flange portion 22 is spot-welded to the end plate portion 14, so that the two unit cells 11 are electrically and mechanically connected to each other in a manner such that they cannot be mechanically separated from each other. In addition, a hole 24 is formed at the center of the flange portion 22, and a terminal 15 of the positive electrode 13 is inserted into the hole 24.

The insulation ring 30A has a pipe-shape, and has a circular-shaped end plate portion 31 which is inserted into a space between the step portion 23 of the connection ring 20 and the other unit cell 11, a pipe portion 32 for surrounding an outer periphery of an end (on the positive electrode 13 side) of the other unit cell, a folded portion 33 extending from the inner-peripheral edge of the end plate portion 31 along the axis of the pipe portion 32, and a number of hemispherical protrusions 34 formed at regular intervals along an outer circumference of the pipe portion 32. In addition, the thickness of the pipe portion 32 of the insulation ring 30A is greater than that of the larger-diameter pipe portion 21 of the connection ring 20.

The insulation ring 30A is fit to the positive electrode 13 side of the other unit cell 11 before the connection ring 20 is spot-welded to the unit cells 11, and the head of the folded portion 33 is put in contact with the end plate portion 14 of the positive electrode 13. Due to the insulation ring 30A, it is possible to reliably avoid a short-circuit between the two unit cells 11.

The insulation ring 30B has the same configuration as that of the insulation ring 30A except that the insulation ring 30B has no protrusions 34 on the outer circumference of the pipe portion 32; thus, explanation of the insulation ring 30B is omitted. In addition, another insulation ring 30B having no protrusions 34 is also attached to an outer periphery of the cell module 11 on the positive electrode 13 side (i.e., on an end side of the cell module 10) where the terminal 15 of the positive electrode 13 is exposed.

When a plurality of the cell modules 10, each having the above-described structure are laid side by side on a plate, the protrusions 34 of each insulation ring 30A of any cell module 10 contact an outer-peripheral face of another cell module 10 adjacent to the above cell module 10, so that a predetermined gap is secured between the above two cell modules 10. Therefore, it is possible to reliably avoid a short-circuit between these cell modules 10. In addition, the protrusions 34 are hemispherical; thus, they are easily slidable. Therefore, the protrusions 34 are not caught by the outer-peripheral face of the adjacent cell module 10 or another member; thus, the cell modules 10 can be easily handled during transport or the like, and are not easily damaged.

Additionally, in the present embodiment, in order to improve insulating performance with respect to the cell modules 10, the entire outer periphery of each cell module 10 is covered with an insulating film 40 (see FIG. 11) made of a heat-shrinkable resin film. However, the insulating film 40 can be omitted.

Next, the cell module unit 90 will be explained with reference to FIGS. 2 and 6 to 11. Note that when the cell module unit 90 is explained with reference to FIGS. 2, 6, and 7, two cell modules 10 are distinguished from each other by assigning different names (i.e., cell modules 10A and 10B) to the two cell modules 10.

Figure 6:
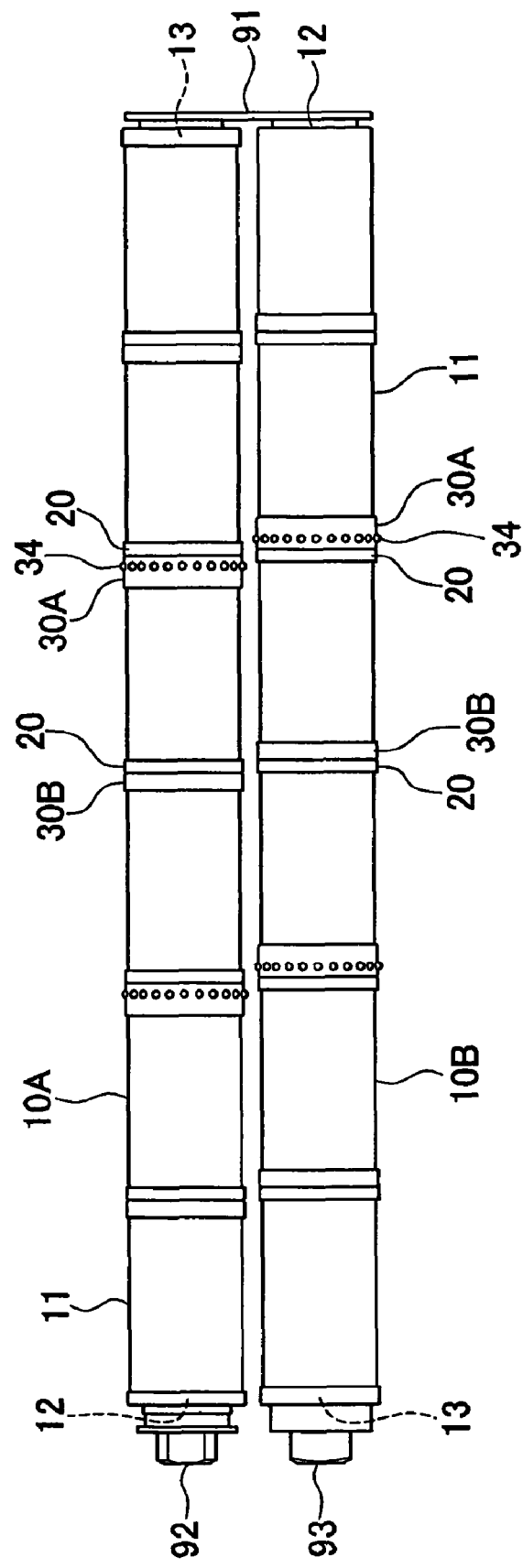
FIG. 6 is a plan view of the cell module unit in a state before the grommets are attached.

FIG. 6 is a plan view of the cell module unit 90 in a state in which the grommets 50 have been removed, and two cell modules 10A and 10B are arranged in a manner such that the directions of the electrodes of the two cell modules are opposite to each other. More specifically, in the cell module 10A shown in FIG. 6, the positive electrode 13 is positioned on the right end side while the negative electrode 12 is positioned on the left end side, and in the cell module 10B, the negative electrode 12 is positioned on the right end side while the positive electrode 13 is positioned on the left end side.

The positive electrode 13 of the cell module 10A and the negative electrode 12 of the cell module 10B are electrically connected and mechanically coupled to each other by using a bus bar 91. A negative-electrode socket 92 is attached to the negative electrode 12 of the cell module 10A while a positive-electrode socket 93 is attached to the positive electrode 13 of the cell module 10B.

The two cell modules 10A and 10B are arranged in a manner such that the protrusions 34 of each insulation ring 30A of the cell module 10A are positioned slightly offset from the position of the protrusions 34 of the corresponding insulation ring 30A of the cell module 10B along the axes of the cell modules 10A and 10B.

Figure 7:
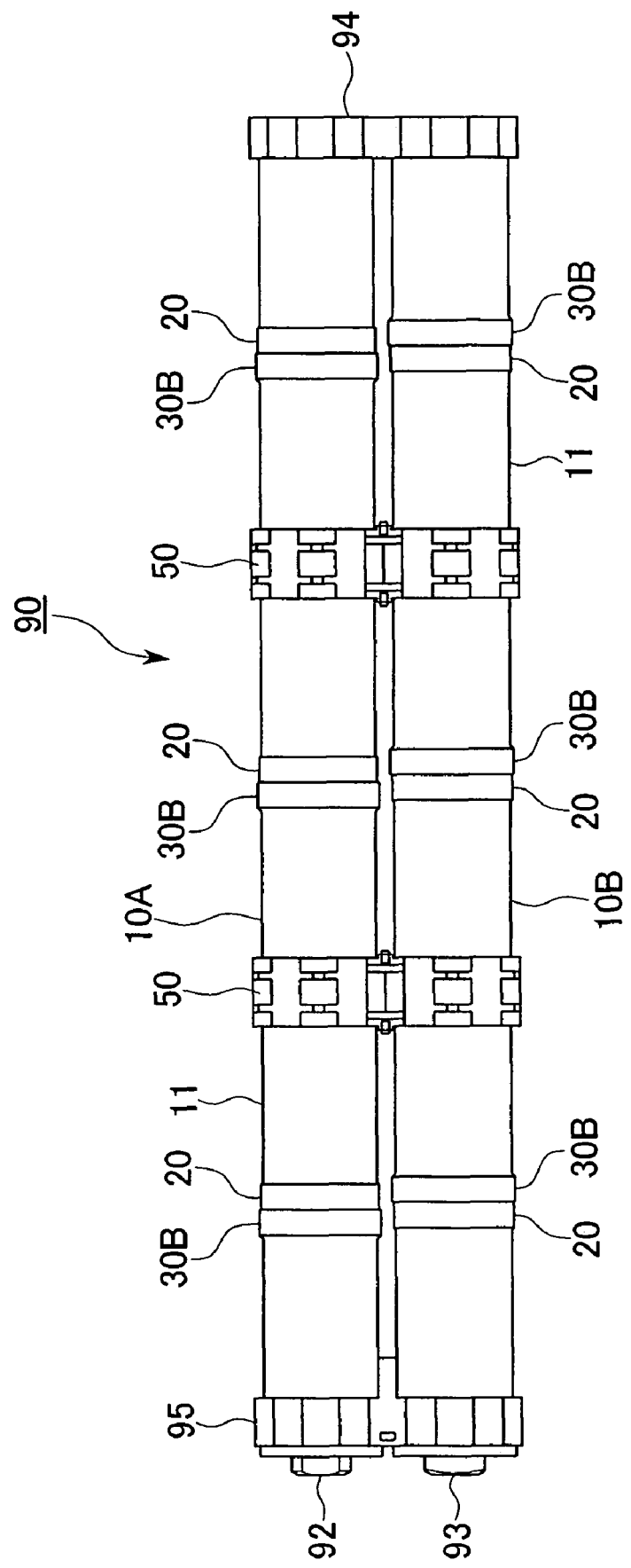
FIG. 7 is a plan view of the cell module unit in a state after the grommets are attached.

As shown in FIG. 7, the cell modules 10A and 10B are coupled with each other while securing a predetermined gap therebetween and arranging the axes of both parallel to each other, by using a cover 94 which covers the bus-bar 91, a cap 95 which covers the sockets 92 and 93, and two grommets 50 hung over both cell modules 10A and 10B in the middle of the axes of the cell modules.

The grommets 50 are attached only to each part where the insulation rings 30A of the cell modules 10A and 10B are provided, and no grommet 50 is attached to any part where the insulation rings 30B are provided.

Figure 8:
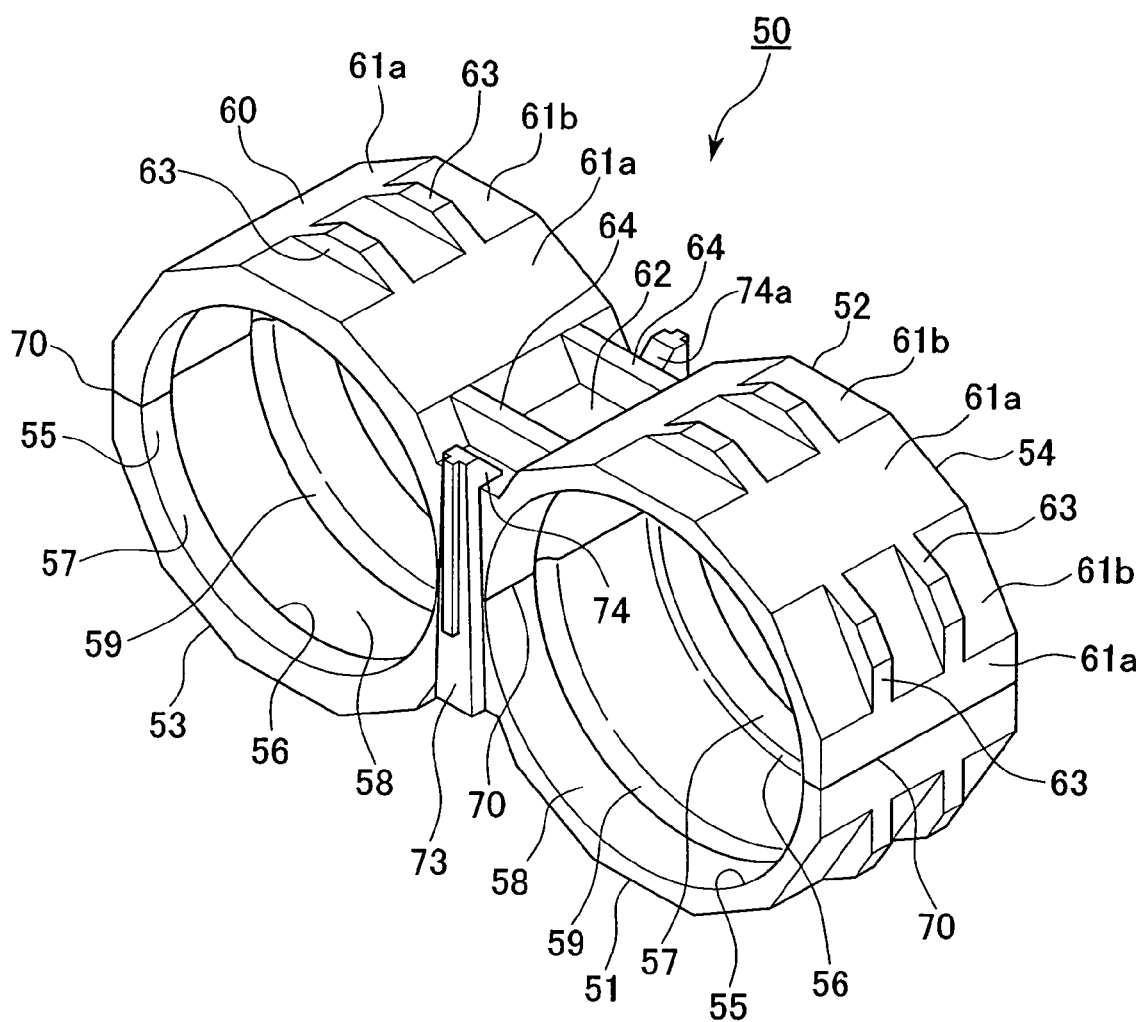
FIG. 8 is a perspective view of the grommet in the embodiment.
Figure 9:
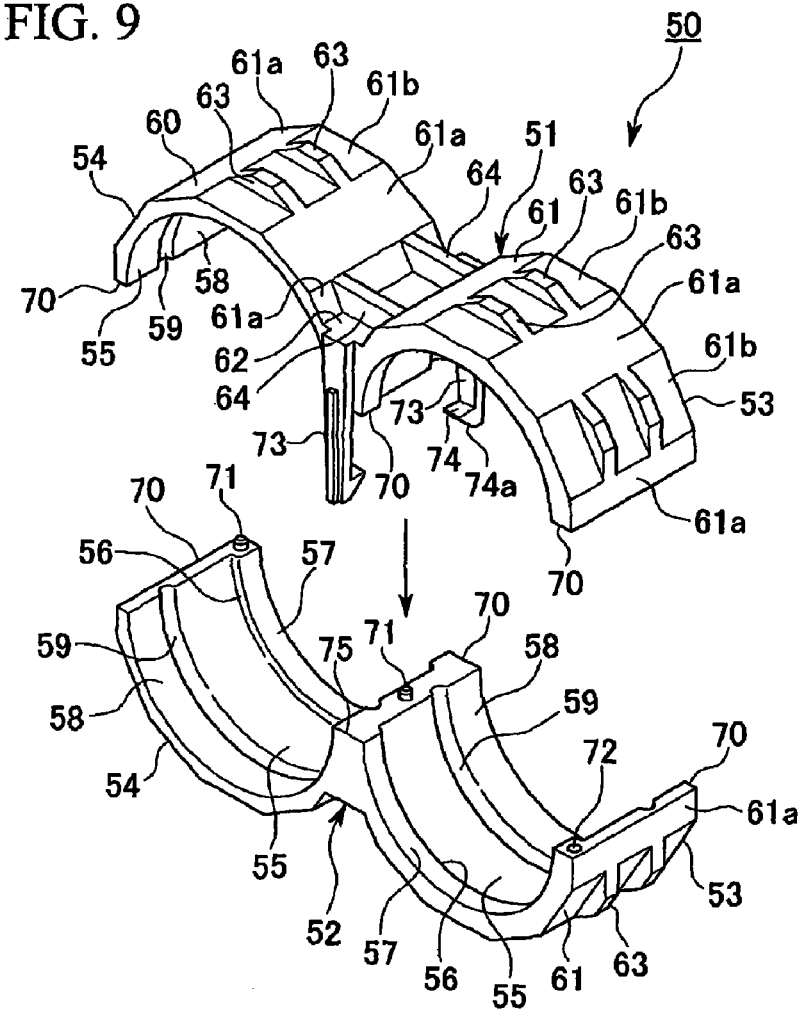
FIG. 9 is an exploded perspective view of the grommet in the embodiment.

Each grommet 50 is made of hard resin and consists of two holding bodies 51 and 52 (see FIG. 9). When the holding bodies 51 and 52 are coupled with each other, two circular holding portions 53 and 54 are formed (see FIG. 8).

The grommet 50 having the holding bodies 51 and 52 coupled to each other will be explained first. In each of the holding portions 53 and 54, a through hole 55 having a circular section is formed, in which the inner diameter on one end along the axis of the holding portion differs from that on the other end. More specifically, the through hole 55 has a step portion 56 closer to an end of the through hole 55 along the axis thereof, and a smaller-diameter portion 57 is formed between this end and the step portion 56, so that a larger-diameter portion 58 is formed on the other end side. In each of the holding portions 53 and 54, the inner diameter of the through hole 55 gradually reduces; however, the inner diameters reduce toward opposite sides between the holding portions 53 and 54. That is, the smaller-diameter portion 57 of the holding portion 53 and the larger-diameter portion 58 of the holding portion 54 are arranged side by side on one end side of the grommet 50 along the axis thereof, while the larger-diameter portion 58 of the holding portion 53 and the smaller-diameter portion 57 of the holding portion 54 are arranged side by side on the other end side of the grommet 50. Here, the axis of the grommet 50 coincides with the axes of the cell modules 10 to which this grommet is attached.

At approximately the center of the larger-diameter portion 58 along the axis thereof, a circular groove 59 (i.e., a fittable portion) having a substantially semicircular section is formed over the circumference of an inner-peripheral face of the larger-diameter portion 58. The groove 59 has such a dimension that the protrusions 34 of the insulation ring 30A which is covered with the insulating film 40 can fit the groove 59. When the cell module 10 is inserted into the through hole 55, the groove 59 faces the protrusions 34 of the insulation ring 30A. The position of the groove 59 of the holding portion 53 is offset from the position of the groove 59 of the holding portion 54 along the axis of the grommet 50.

Each of the holding portions 53 and 54 has a substantially regular dodecagonal section (which is perpendicular to the axis of the grommet 50), and the holding portions 53 and 54 are coupled in a manner such that one of the twelve sides of each dodecagon is shared. Therefore, an outer-peripheral face 60 of the coupled holding portions 53 and 54 includes faces 61a and faces 61b for forming the assumed dodecagons, and two link faces 62 formed at a link portion between the holding portions 53 and 54.

Each face 61a is flat; however, each face 61b has a pair of fins 63 which protrude from a flat surface of the face 61b. Each fin 63 has a trapezoidal shape viewed along the axis of the grommet 50, and the fins 63 of each pair are arranged while securing a predetermined distance therebetween along the axis of the grommet 50.

Figure 10:
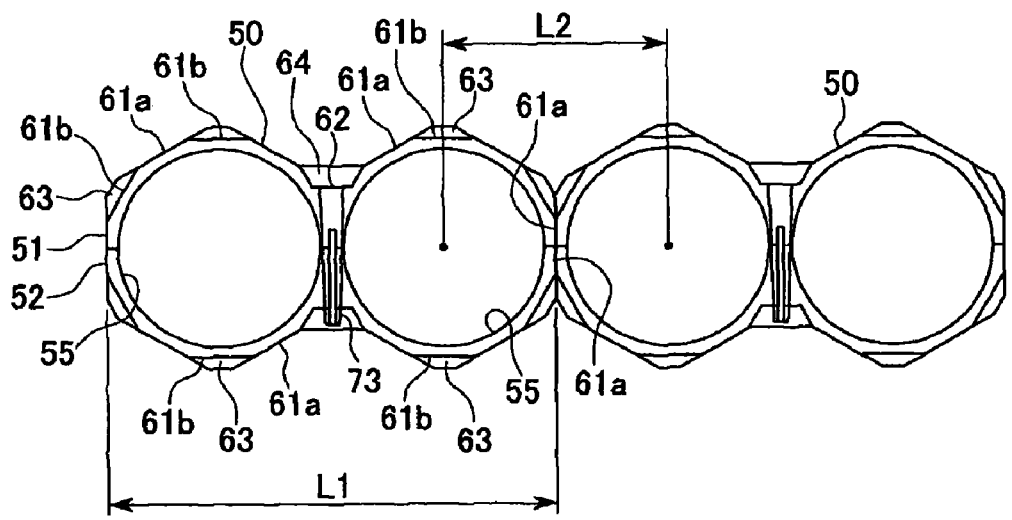
FIG. 10 is a front view of two grommets which are horizontally arranged side by side in the embodiment.

As shown in FIG. 10, when the grommet 50 is laid in a manner such that the two through holes 55 of the grommet 50 are horizontally positioned side by side, the faces respectively positioned at the top and the bottom along the vertical axis are faces 61b having fins 63. Inner portions of the outer-peripheral face of the grommet 50 from the top and bottom faces (i.e., 61b) along the horizontal axis are formed using faces 61a having no fins, while outer portions of the outer-peripheral face of the grommet 50 from the top and bottom faces along the horizontal axis are formed using faces 61b having fins 63 and faces 61a having no fins which are alternately arranged. Accordingly, the outermost faces of the grommet 50 along the horizontal axis are faces 61a having no fins.

The link faces 62 are arranged parallel to a plane which includes the axes of both holding portions 53 and 54, and each link face 62 couples one face 61a of the holding portion 53 and one face 61a of the holding portion 54. A pair of ribs 64 is formed on each link face 62, where the ribs 64 are separated from each other by a predetermined distance along the axis of the grommet 50. This distance is predetermined so that the pair of the fins 63 on the face 61b can be almost exactly inserted between the ribs 64 (i.e., almost without generating a gap between them). The height of the ribs 64 is equal to or slightly greater than the height of the fins 63.

The two holding bodies 51 and 52 have forms obtained by equally dividing a body consisting of the holding portions 53 and 54 into two parts at three divided portions 70 along a diametral line. Each of the holding bodies 51 and 52 is attached over two cell modules 10 to be held.

Each of the three divided portions 70 has two divided faces which respectively belong to the holding bodies 51 and 52. In the holding body 52, two of the three divided faces, which include the center divided face, respectively have fittable protrusions 71, and the remaining divided face has a fittable hole 72. In contrast, in the holding body 51, each of the three divided faces has a fittable hole or a fittable protrusion which corresponds to the fittable protrusion 71 or the fittable hole 72 on the opposing face of the holding body 52. Due to fitting between these fittable protrusions and the corresponding fittable holes, when the holding bodies 51 and 52 are coupled with each other, the holding bodies 51 and 52 are positioned so that the grooves 59 of the holding portions 53 and 54 are linked to produce a circular form.

Additionally, in the holding body 51, arms 73 are provided at the divided portion 70 positioned between the holding portions 53 and 54, where each arm 73 linearly extends toward the holding body 52 from an end of the divided portion 70 along the axis of the grommet 50 (i.e., extends along an outer face of the holding body 52 when the holding bodies 51 and 52 are coupled). At the head of each arm 73, a fittable protrusion 74 is provided, which protrudes inward along the axis of the grommet 50. A lower face 74a of the fittable protrusion 74 has a tapered shape. In a process of attaching the holding body 51 (separated from the holding body 52) to the holding body 52 (see the linear arrow in FIG. 9), the lower faces 74a of both arms 73 are respectively guided by corners 75 of the center divided portion 70 of the holding body 52, so that head portions of the arms 73 are elastically opened from their original positions. When the fittable protrusions 74 protrude from the link face 62 of the holding body 52, the head portions of the arms 73, which have been opened, are elastically returned to the original form, so that as shown in FIG. 8, the fittable protrusions 74 are fit to the link face 62 of the holding body 52, thereby coupling the holding bodies 51 and 52 as a single body.

In the present embodiment, each arm 73 functions as a fittable member of a coupling device, and the link face 62 of the holding body 52 functions as a fitting reception portion of the coupling device.

The procedure of coupling the two cell modules 10 by using the grommets 50 will be explained below.

First, the cell modules 10A and 10B are mounted on the holding body 52 which has no arms 73. In this process, the protrusions 34 of each insulation ring 30A of the cell module 10A are fit to the relevant groove 59 of the holding portion 53 of the holding body 52, while the protrusions 34 of each insulation ring 30A of the cell module 10B are fit to the relevant groove 59 of the holding portion 54 of the holding body 52. In this arrangement, in the holding portions 53 and 54 of the holding body 52, the larger-diameter pipe portion 21 of the connection ring 20 is positioned at the step portion 56 (see FIG. 11).

Figure 11:
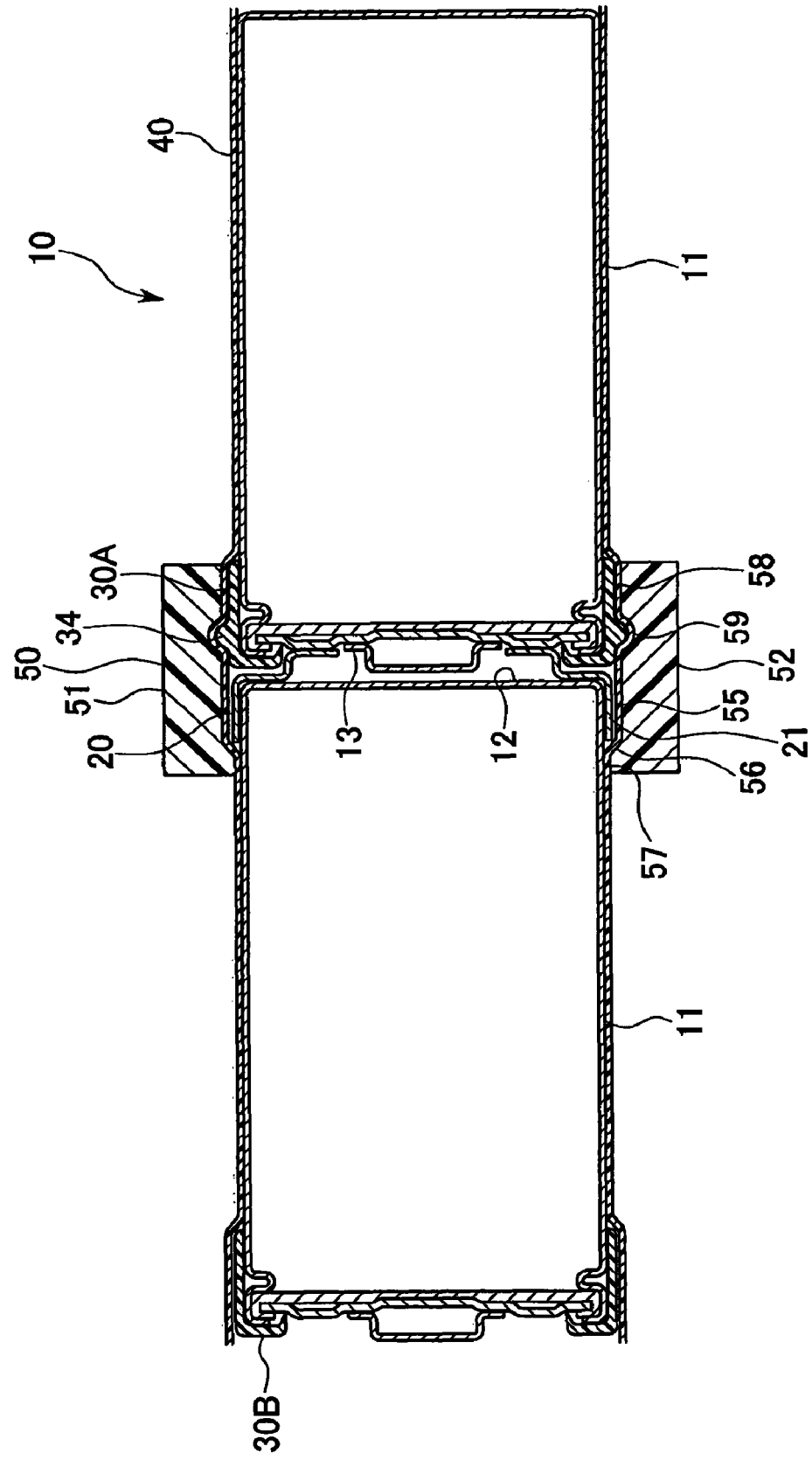
FIG. 11 is a sectional view of a portion where the grommet is attached, in the cell module unit of the embodiment.

After this step, the holding body 51 having the arms 73 is arranged over the cell modules 10A and 10B above the holding body 52, and the holding body 51 is pushed downward while elastically opening the arms 73 as discussed above, so as to fit the fittable protrusions 74 of the arms 73 to the link face 62 of the holding body 52. Accordingly, the protrusions 34 of each insulation ring 30A of the cell module 10A are fit to the relevant groove 59 of the holding portion 53 of the holding body 51, while the protrusions 34 of each insulation ring 30A of the cell module 10B are fit to the relevant groove 59 of the holding portion 54 of the holding body 51. Here, FIG. 11 shows a section of one of the holding portions 53 and 54.

As described above, the protrusions 34 of each insulation ring 30A of the cell module 10A are fit to the relevant groove 59 of the holding portion 53 of the grommet 50, thereby highly accurately positioning the grommet 50 along the axis of the cell modules 10A and restricting movement of the grommet 50 along the axis thereof. Similarly, the protrusions 34 of each insulation ring 30A of the cell module 10B are fit to the relevant groove 59 of the holding portion 54 of the grommet 50, thereby highly accurately positioning the grommet 50 along the axis of the cell modules 10B and restricting movement of the grommet 50 along the axis thereof.

In this way, each grommet 50 surrounds the relevant connection rings 20 and insulation rings 30A of the cell modules 10A and 10B.

In the arrangement of the cell module units 90 in the cell box 2 shown in FIG. 1, the cell module 10 positioned at the most left in the bottom row, and the cell module 10 positioned at the most left in the second row from the bottom, form one cell module unit 90. On the other hand, the cell module 10 positioned second from the left end in the second row from the bottom, and the cell module 10 positioned at the most left in the third row from the bottom, form one cell module unit 90. Regarding all the other cell modules 10, two horizontally-adjacent cell modules 10 form one cell module unit 90. However, this arrangement shown in FIG. 1 is only an example, and the present invention is not limited to such an arrangement.

Any adjacent cell module units 90 are aligned or stacked in a manner such that the faces 61a (having no fins 63) of the two cell module units 90 are put in contact with each other, where the faces 61a are included in the outer-peripheral face 60 of the holding portions 53 and 54 of the grommet 50. In addition, regarding any two vertically adjacent cell module units 90 (i.e., belonging to two rows which are vertically arranged), the faces 61b (having the fins 63) of the grommet 50 of the upper cell module unit 90 are positioned above the ribs 64 of the grommet 50 of the lower cell module unit 90, so that the fins 63 are inserted between the ribs 64 leaving substantially no gap between them.

As described above, each grommet 50 is highly accurately positioned with respect to the axes of the cell modules 10. Therefore, as shown in FIG. 1, when a number of the cell module units 90 are stacked so as to assemble the battery pack 1, the fins 63 can be reliably inserted between the ribs 64; thus, it is possible to very easily arrange a number of cell modules 10 in a zigzag. Furthermore, it is possible to highly accurately position adjacent cell module units 90 with respect to the axes of the cell modules 10, and to restrict relative movement along the axis.

In accordance with the grommets 50 of the present embodiment, two cell modules 10 can be aligned and held by one grommet 50, thereby improving productivity. In addition, the grommet 50 has two divided holding bodies 51 and 52, each being attached over the two cell modules 10; thus, the grommet 50 can be easily attached to the cell modules 10, thereby also improving productivity. As long as elasticity of the arms 73 can be secured, the other parts of the grommet 50 do not require elasticity; thus, flexibility in selection of the material for the grommet 50 can be improved.

In addition, in the grommet 50, the arms 73 for coupling the holding bodies 51 and 52, and the link face 62 to which the fittable protrusions 74 of the arms are fit are provided at the divided portion 70 positioned between the holding portions 53 and 54, and the arms 73 protrude outward along the axis of the grommet 50. Therefore, as shown in FIG. 10, the dimension L1 of the two cell modules 10 with respect to the axis along which the cell modules 10 are aligned side by side, can be reduced, thereby reducing the size of the cell module unit 90. Also as shown in FIG. 10, when two grommets 50—are horizontally arranged, the faces 61a of the grommets 50 can be put in contact with each other; thus, the pitch L2 between the adjacent cell modules 10 can be smaller, thereby downsizing the battery pack 1.

In addition, the groove 59 of the holding portion 53 is positioned offset from the position of the groove 59 of the holding portion 54 along the axis of the grommet 50; thus, the thickness of the divided portion 70 between the holding portions 53 and 54 can be small. As a result, the two cell modules 10 held by the grommets 50 can be closer to each other in the arrangement of the cell modules 10, thereby making it possible to reduce the size of the cell module unit 90 and also the battery pack 1.

Figure 12:
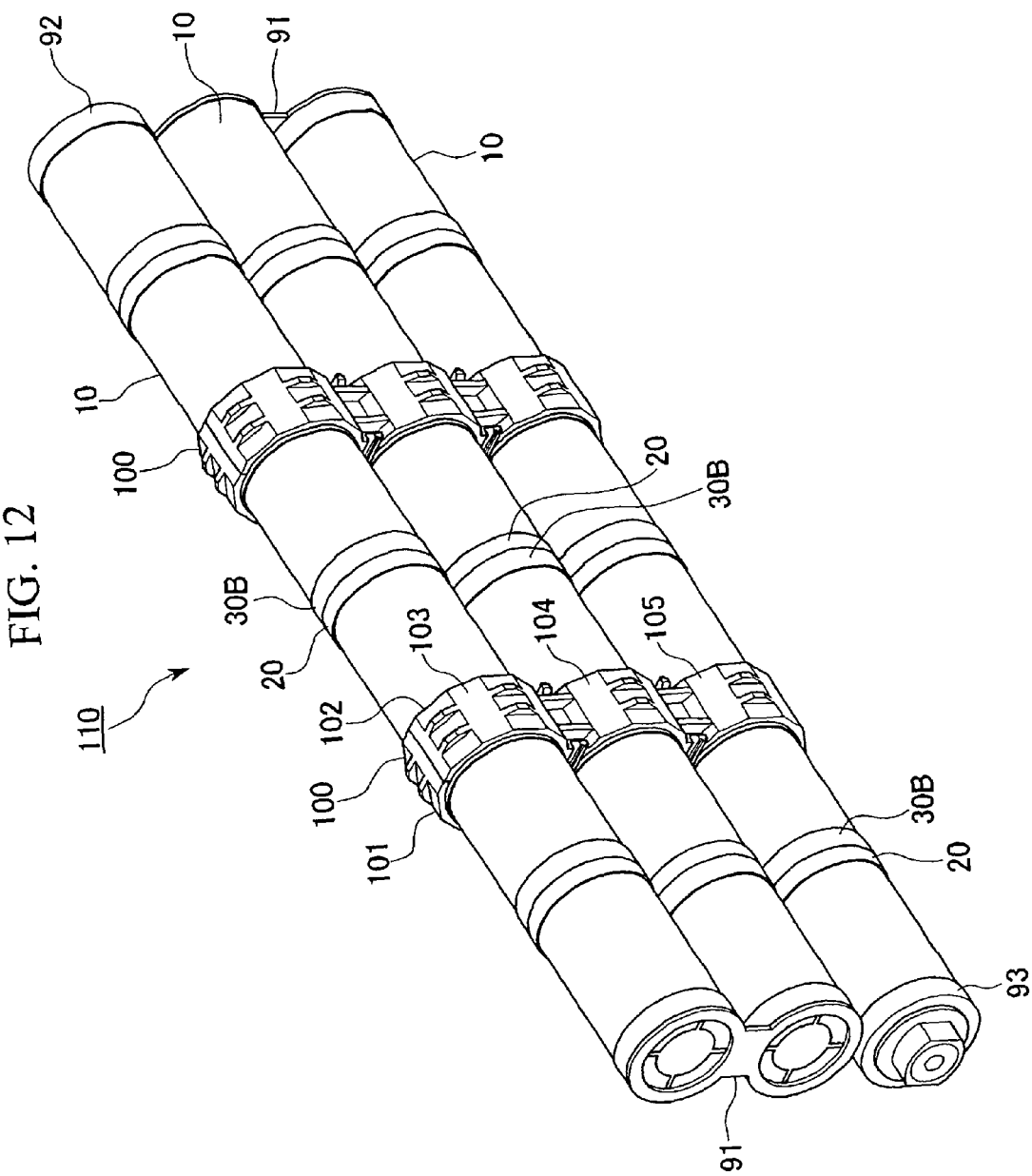
FIG. 12 is a perspective view of the cell module unit in another embodiment.

The number of the cell modules 10 coupled by the grommets 50 is not limited to two, but may be three or more. FIG. 12 shows an example of a cell module unit 110 having three cell modules 10 combined using grommets 100. In this case, each grommet 100 consists of two holding bodies 101 and 102 by which each of three holding portions 103, 104, and 105 are divided into two portions along a diametral line.

Figure 13:
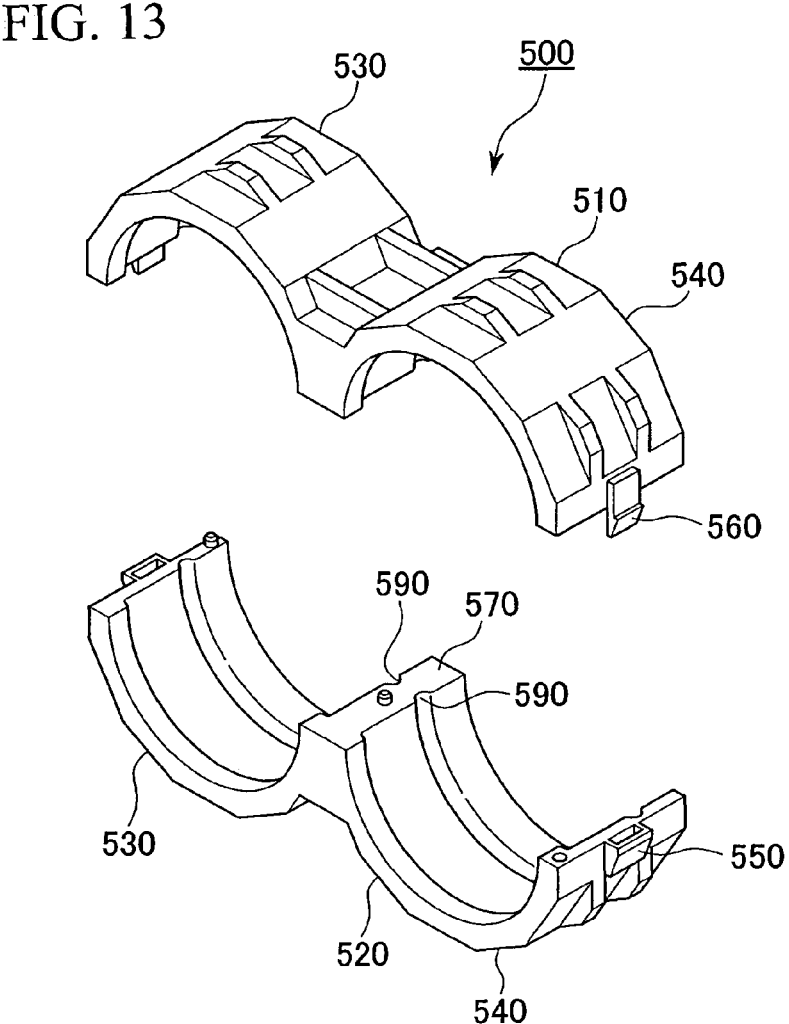
FIG. 13 is an exploded perspective view of the grommet in an comparative example.
Figure 14:
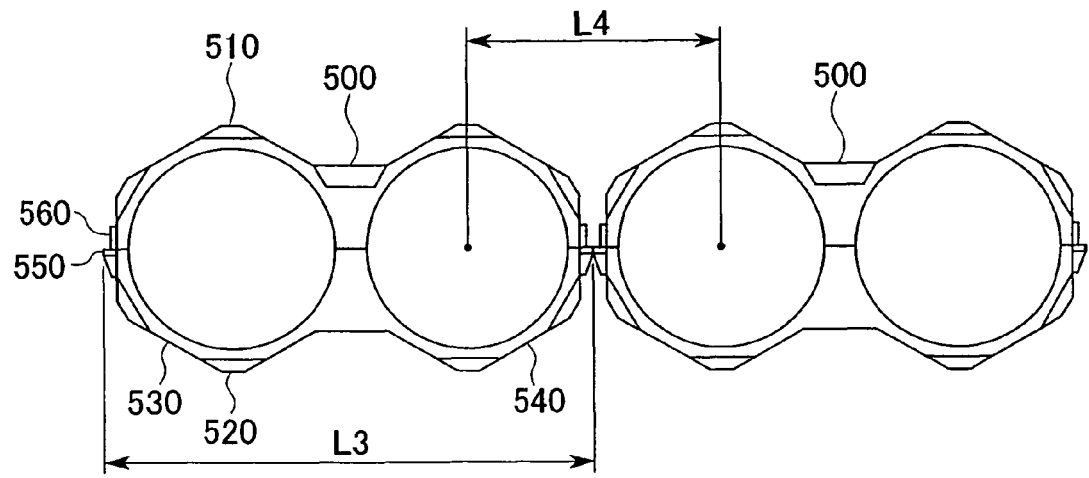
FIG. 14 is a front view of two grommets which are horizontally arranged side by side in the comparative example.

FIGS. 13 and 14 show a comparative example. In a grommet 500 as the comparative example shown in FIG. 13, pairs of female coupling devices 550 and male coupling devices 560 for coupling holding bodies 510 and 520 are provided on the outside of the grommet 500 in an axis along which the cell modules are arranged. In this case, the dimension L3 for the grommet 500 (see FIG. 14) in the axis along which the cell modules are arranged is larger than the dimension L1 of the grommet 50 of the above embodiment. In addition, in the grommet 500 of the comparative example, the position of a groove 590 of the holding portion 530 is the same as the position of the groove 590 of the holding portion 540 along the axis of the grommet 500. In this case, the thickness of a divided portion 570 between the holding portions 530 and 540 should be large, which also brings about the above result such that the dimension L3 in the axis along which the cell modules are arranged is larger than the dimension L1 of the grommet 50 of the above embodiment. Therefore, in the comparative example, when two grommets 500 are arranged horizontally contacting each other (see FIG. 14), the pitch L4 between adjacent cell modules is large, thereby increasing the size of the relevant battery pack.

OTHER EMBODIMENTS

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

In an aforementioned embodiment, the fittable portion for receiving the protrusions 34 of the insulation ring 30A is implemented using the circular groove 59. However, instead of the circular groove 59, hemispherical holes formed at regular intervals along a circumferential line, that is, at positions corresponding to the positions of the protrusions 34 may function as the fittable portion.

Also in the aforementioned embodiment, the insulation ring 30A having the protrusions 34 and the insulation ring 30B having no protrusions 34 are distinguishably used. However, all the insulation rings can be insulation rings 30A having protrusions 34. In this case, the grommets 50 may be attached to the outer peripheries of all the insulation rings 30A, or be attached to the outer peripheries of some of the insulation rings 30A.

What is claimed is:

1. A holding member attachable to outer peripheries of a plurality of adjacent cylindrical cell modules which are arranged in parallel along axes thereof, each of said plurality of cell modules being formed by a plurality of unit cells serially connected to each other, said holding member being positionable in the middle of said plurality of cell modules along the axes thereof so that a gap is formed between said plurality of cell modules, said holding member comprising:
   first and second holding bodies, divided at a divided portion, said first and second holding bodies forming a plurality of circular holding portions when coupled to each other for respectively holding said plurality of cell modules;
   a coupling device for coupling said first and second holding bodies, said coupling device being disposed between two adjacent circular holding portions of said plurality of circular holding portions formed by said first and second holding bodies,
   wherein said coupling device is provided at at least one end of the first and second holding bodies, in an axis direction of said first and second holding bodies formed by said first and second holding bodies, and
   wherein said coupling device comprises
      a fittable member which extends from the first holding body, along an outer periphery of the second holding body, and beyond a link face of the second holding body, when said first and second holding bodies are coupled; and
      a fitting reception portion, formed in said second holding body, to which the fittable member is fit, said fitting reception portion being provided on said link face of said second holding body.

2. The holding member in accordance with claim 1, wherein each of said plurality of cell modules has an insulation ring positioned between two serially connected unit cells of said plurality of unit cells, the insulation ring having a pipe portion surrounding a circumference of the unit cells, and protrusions being formed on an outer-peripheral face of the pipe portion;
   wherein a fittable portion is formed in an inner face of each of said circular holding portions formed by said first and second holding bodies, said fittable portion being fittable to the protrusions of the insulation ring, and
   wherein positions of the fittable portions are offset from each other along axes of said plurality of cell modules among every adjacent two circular holding portions of said plurality of circular holding portions formed by said first and second holding bodies.

3. The holding member in accordance with claim 1,
wherein a fittable protrusion is provided on an outer-peripheral face of each of said plurality of circular holding portions; and
wherein a joint portion is formed between two adjacent circular holding portions of said plurality of circular holding portions, said fittable protrusion fitting in said joint portion.

4. The holding member in accordance with claim 3,
wherein the fittable protrusion is a pair of fins; and
wherein the fitting reception portion is a space defined by a pair of ribs, said pair of fins being insertable into said space leaving substantially no gap between said fins and said ribs.

5. The holding member of claim 1,
wherein said fittable member extends from the first holding body, along an entire outer periphery of the second holding body,
wherein said link face is parallel to said divided portion of said first and second holding bodies.

6. A battery pack, comprising:
a plurality of cell modules, each of said plurality of cell modules being formed by a plurality of unit cells serially connected to each other;
a plurality of holding members, each including first and second holding bodies and being divided at a divided portion, said first and second holding bodies of each of said plurality of holding members forming a plurality of circular holding portions when coupled to each other for respectively holding said plurality of cell modules; and
a coupling device for coupling said first and second holding bodies of each of said plurality of holding members, said coupling device being disposed between two adjacent circular holding portions of said plurality of circular holding portions,
wherein said plurality of cell modules are arranged in a zigzag by aligning and stacking said plurality of holding members,
wherein at least one outer-peripheral face of each of said plurality of holding members is made to contact at least one outer-peripheral face of an adjacent one of said plurality of holding members,
wherein said coupling device is provided at at least one end of the first and second holding bodies, in an axis direction of said first and second holding bodies, and
wherein said coupling device comprises a fittable member which extends from the first holding body, along an outer periphery of the second holding body, and beyond a link face of the second holding body, when said first and second holding bodies are coupled; and
a fitting reception portion, formed in said second holding body, to which the fittable member is fit, said fitting reception portion being provided on said link face of said second holding body.

7. The battery pack in accordance with claim 6,
wherein each of said plurality of cell modules has an insulation ring positioned between two serially connected unit cells of said plurality of unit cells, the insulation ring having a pipe portion surrounding a circumference of the unit cells, and protrusions being formed on an outer-peripheral face of the pipe portion;
wherein a fittable portion is formed in an inner face of each of said circular holding portions formed by said first and second holding bodies, said fittable portion being fittable to the protrusions of the insulation ring, and
wherein positions of the fittable portions are offset from each other along axes of said plurality of cell modules among every adjacent two circular holding portions of said plurality of circular holding portions formed by said first and second holding bodies.

8. The battery pack in accordance with claim 6,
wherein a fittable protrusion is provided on an outer-peripheral face of each of said plurality of circular holding portions; and
wherein a joint portion is formed between two adjacent circular holding portions of said plurality of circular holding portions, such that said fittable protrusion of one of said plurality of holding members is fitted said joint portion of another of said plurality of holding members.

9. The battery pack in accordance with claim 8,
wherein the fittable protrusion is a pair of fins; and
wherein the fitting reception portion is a space defined by a pair of ribs, said pair of fins being insertable into said space leaving substantially no gap between said fins and said ribs.

10. The battery pack of claim 6,
wherein said fittable member extends from the first holding body, along an entire outer periphery of the second holding body,
wherein said link face is parallel to said divided portion of said first and second holding bodies.

* * * * *